July 30, 1963 R. K. STRASEL 3,099,124
LAWN MOWER ROLLER ADJUSTMENT
Original Filed April 17, 1961 2 Sheets-Sheet 1

INVENTOR:
R.K. STRASEL
BY Arthur J. Hangmann
ATTORNEY

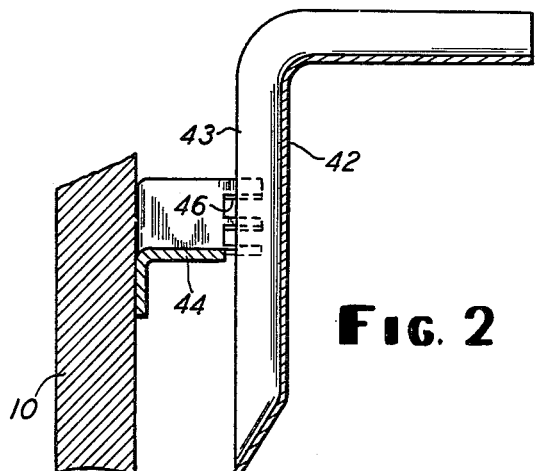
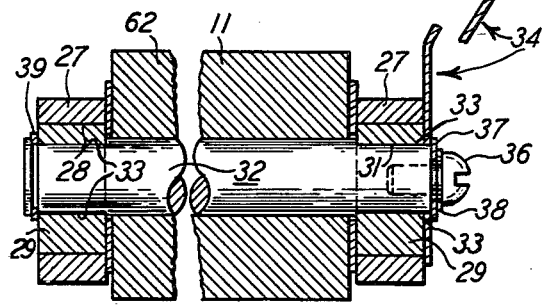
FIG. 2
INVENTOR:
R.K. STRASEL 3,099,124
Patented July 30, 1963

1

3,099,124
LAWN MOWER ROLLER ADJUSTMENT
Raymond K. Strasel, Winthrop Harbor, Ill., assignor to Jacobsen Manufacturing Co., Racine, Wis., a corporation of Wisconsin
Original application Apr. 17, 1961, Ser. No. 103,381. Divided and this application Apr. 19, 1962, Ser. No. 188,774
5 Claims. (Cl. 56—249)

This invention relates to a cutting adjustment for a reel type of lawn mower. More specifically, it relates to a fine adjustment for the ground-engaging roller of the mower, and it is particularly adaptable to a reel type of lawn mover which is employed in mowing the putting green of a golf course and in like applications where the finest and most accurate type of mowing is required. This is a divisional application of application Serial Number 103,381, filed April 17, 1961.

It is a general object of this invention to provide an accurate and fine adjustment for the ground-engaging roller of a reel type of lawn mower with the roller being adjustable in a minute degree and beyond the adjustment normally provided for the roller.

Another object of this invention is to provide an adjustment for the roller of a lawn mower wherein the adjustment can be easily selected in degree and easily and accurately brought to a desired position and retained in that position even against the normal vibration and movement of the lawn mower.

Still another object of this invention is to provide the adjustment mentioned in the foregoing and to do so with only a minimum of addition and alteration to the already existing type and construction of lawn mower, such as the putting green mower for the golf course.

Other objects and advantages will become apparent upon reading the following description in light of the acompanying drawings wherein:

FIG. 2 is a sectional view taken on the line 2—2 of FIG. 1 and showing a fragment thereof.

The same reference numerals refer to the same parts between the two views.

Figure 1:
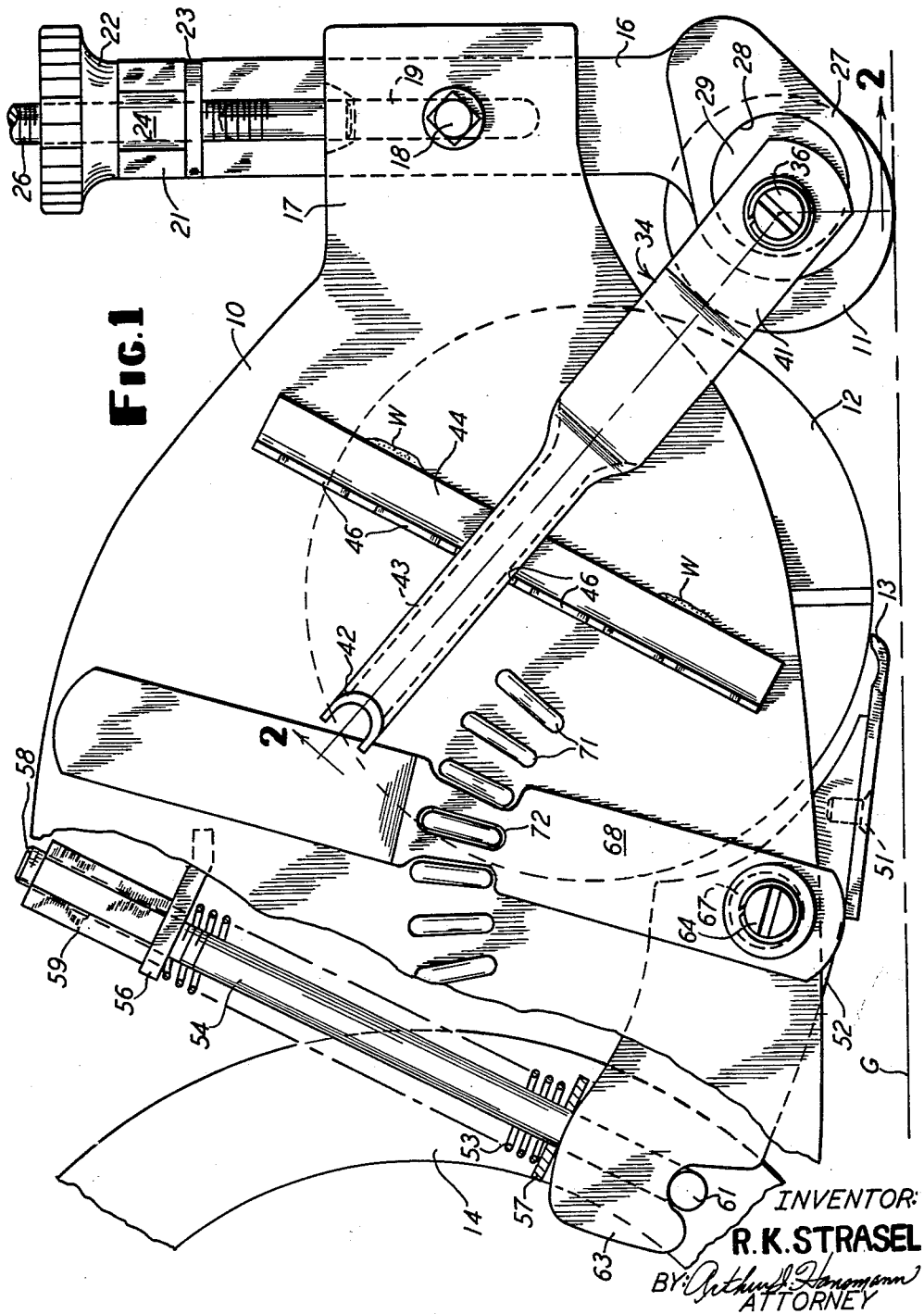
FIG. 1 is a side elevational view of a front fragment of a lawn mower incorporating a preferred embodiment of this invention.

As mentioned, the lawn mower of this particular invention is the reel type and particularly the type which includes a forwardly disposed ground-engaging roller which is included and disposed for permitting the most accurate mowing known today. Patent No. 1,767,510 also shows this type of mower which includes the forwardly disposed ground-engaging roller and the reel and bed plate and then the rearwardly disposed ground-engaging wheel or member such that the mower is supported at a location forward of the reel and also rearward of the wheel.

The drawings therefore disclose side plates or frames 10 which support the forwardly disposed roller 11 and the grass cutting reel 12 and the bed plate 13 and the ground-engaging member or wheel 14. A ground line indicated "G" is also shown and it will of course be understood that the roller 11 and the wheel 14 roll on the ground line G when the mower is in the operating position for the reel 12 to cut the grass against the bed knife 13.

With this general description of a substantially conventional lawn mower, the following will therefore describe the parts in detail, including the elements of course of the invention. A standard 16 is vertically slidably mounted in the forward end 17 of the frame or plate 10, and the latter accommodates a bolt 18 which extends therethrough for clamping the standard 16 in its adjusted position in a conventional and well-known manner. Thus the standard 16 has the usual slot 19 extending therefrom for reception

2 of the shank of the bolt 18 so that the latter can secure the standard 16 in the selected elevated position. In order to permit adjustment of the standard 16 with respect to the frame 10, the standard 16 has the usual angular and bifurcated upper end 21 extending between the upper nut portion 22 and the lower nut portion 23 of a spool-like member which includes an intermediate portion 24 extending between and connecting together the parts 22 and 23 such that upon movement of the spool, the flanked upper end 21 of the standard 16 will similarly be moved. To accomplish a controlled movement, a threaded stud 26 extends axially of the spool member and it abuts the frame front end 17 so that, upon rotation of the spool member, the latter is displaced vertically and it of course carries the standard 16 therewith so that the desired adjustment is accomplished. Then, of course, the bolt 18 will be tightened so that the standard 16 will be secured in its set position.

The lower end of the standard 16 includes a boss or hub 27 which has a circular opening or socket 28 extending therethrough. The opening or socket 28 has a cam 29 rotatably disposed therein and the latter in turn has an eccentrically disposed circular opening 31 extending therethrough for rotatably receiving an offset member or shaft 32 which extends across the width of the mower. In turn, the shaft 32 rotatably supports the ground-engaging roller 11, and it will of course be understood that there may be several such rollers 11, and this of course is the usual and well-known construction of supporting the front end of the mower by means of the several rollers 11 and 62 on the shaft 32. FIG. 2 also shows that the standard 16 exists on both sides of the mower in that two bosses 27 are shown in FIG. 2, and this also is of a well-known mower construction and need not be further described in order that a complete description of the invention be made known to one skilled in the art.

Both ends of the shaft 32 are shown to be milled as at 33 to have the two opposite flats 33 receive a lever or rotation-inducing member 34 such that the member 34 is mounted to be non-rotatable with respect to the shaft 32 so that upon rotation of the member 34, the shaft 32 will rotate in an identical amount. A screw or fastener 36 is shown threaded into this end of the shaft 32 and a washer 37 and a lock washer 38 are also disposed on the shaft 32 and the screw 36 to secure the lever 34 to the shaft 32 as shown. The opposite end of the shaft 32 is shown to be provided with a snap ring 39 which secures that end of the shaft 32 to the boss 27. Milled ends 33 also extend through the cams 29.

At this time it will therefore be understood that the cams 29 are of course eccentric with respect to the axis of the shaft 32 such that upon rotation of the shaft 32 by means of the lever 34, the cams 29 will also be rotated in the sockets 28 and this rotation will of course vertically displace the shaft 32 and correspondingly vertically displace the rollers or ground-engaging members 11 and 62. In this manner, the reel 12 is vertically displaced in accordance with the adjustment or displacement of the ground-engaging members 11 and 62, and this therefore effects the desired vertical displacement of the reel 12 in order that the grass can be cut at the specific desired elevation. The lever 34 therefore consists of the lower end 41 which is mounted on the shaft 32 to rotate therewith, and the upper end 42 of the lever 34 is the handle end and it is shown to be formed into two sides designated 43. A rack or indexing member 44 is attached to the frame 10, and is shown to be attached thereto by means of the welding indicated "W," but it will of course be understood that the rack 44 could be made by being cast integral with the member 10.

The indexing member 44 includes a plurality of openings or notches 46 which receive the lever handle 42 so that the lever 34 can of course be set in any desired notch 46 and thus the particular rotation of the shaft 32 is likewise set and retained in the set position. It will of course be understood that the lever 34 is of a spring material so that the handle 42 can be withdrawn from the notches 46 and moved to another selected notch 46 and released for re-entry of the selected notch. Also, it will be understood that the standard 16, being vertically adjustable, will require the lever 34 to be displaced vertically and thus the engagement between the lever 34 and the rack 44 must be adapted to accommodate the adjustment of the standard 16 and this is of course provided for in the particular indexing mechanism shown as comprised of the lever 34 and the rack 44 since the lever 34 can slide along its longitudinal axis with respect to the rack 44.

Of course it will now also be understood that the indexing mechanism which consists of the members 34 and 44, and the cams 29, comprises a structure which permits vertical adjustment of the reel 12 about of course the ground point of contact of the rear wheel 14, and in a minute or accurate amount which is not accurately achieved by the heretofore-described adjustment of the standard 16, and the fine adjustment is of course highly desirable and even required in the most accurate type of mowing, such as the golf course putting green.

Referring next to the adjustment for the bed knife 13, it will be noted that the knife 13 is supported by means of the usual screw 51 in the shoe or support member 52 which is conventionally provided in the reel type of lawn mower. The support member 52 is mounted in the mower by a spring type of mounting which consists of the compression spring 53 and its control rod 54 and the spring extends around the rod and between a stationary support plate 56 and a lower plate 57. The plate 56 is of course attached in a fixed position to the frame 10 and the rod 54 extends thereabove in a threaded portion 58 which engages a nut 59. Thus, since the lower end 61 of the rod 54 engages the rear end of the member 52, rotation of the nut 59 extends or withdraws the rod 54 and accordingly this displaces the rear end 63 of the member 52 as the latter is pivoted about a cam support hereinafter described and secured by the bolt 64.

Thus a bolt 64 is threaded into a shaft (not shown) which extends across the mower and supports the member 52 thereacross. The shaft includes two cam portions 67 which are an affixed part of the shaft and they therefore rotate with any rotation of the shaft, and such rotation is induced by the lever or rotating means 68 which engages the shaft so that the lever 68 and the shaft are connected to rotate together.

The frame 10 has indexing pieces or projections 71 attached thereon, and the lever 68 has an opening 72 for receiving the selected one of the projections 71 as the lever 68 is rotated into alignment with the selected projection 71. Again, of course, the lever 68 is of a spring material so that it can be withdrawn from the projection 71 and rotated therepast to another selected projection 71 and then engaged with the latter projection. It will thus now be understood that upon rotation of the shaft by means of the lever 68, the cams 67 will similarly be rotated and thus they will vertically displace the support member 52 to likewise displace the bed knife 13 with respect to the reel 12 to bring the knife either closer or further away from the reel 12 as desired and thus a minute and accurate adjustment is provided.

Thus, in both adjustments, there is a circular socket, such as 28 on boss 27, for receiving the cam or circular member 29. Further, there is an offset member 32 on the member 29, such that rotation of the member 29 effects the desired adjustment or cam action. Further, there is an indexing or rotation means, in elements 34 and 44 and for inducing the accurate rotation of the members 29. Also, a major or initial adjustment is effected through the threaded nut 22 which is connected to the member 16 which in turn has the circular member 29 thereon. Therefore, the roller 11 is an adjustable member. The levers 34 and 68 are of spring material for their functions.

Thus, the adjustments can be speedily and easily made to an accurate degree, and the precise adjustment is readily visible. A wide arc of handle or lever movement effects the minute adjustment desired for maximum accuracy. Also, only one lever is required for each adjustment which can thus be made on only one side of the mower. Another feature is that lever 34 is sufficiently long to provide the desired mechanical advantage for rotating the member 32 against the weight of the mower when raising same.

What is claimed is:

1. A cutting adjustment for a lawn mower of the type including a cutting reel and a bed knife and a rotatably mounted ground-engaging roller, comprising a standard included in said mower and being uprightly fixedly disposed and having a socket in the lower end thereof, a rotatable member rotatably mounted in said socket, an offset member attached to said rotatable member and constituting a cam with the eccentricity extending in the upright plane for upright displacement of said offset member upon rotation of said rotatable member, means operatively connected with said rotatable member for rotating the latter, said ground-engaging roller being mounted on said offset member for upright adjustable displacement in response to rotation of said rotatable member.

2. A cutting adjustment for a lawn mower of the type including a cutting reel and a bed knife and a rotatably mounted ground-engaging roller, comprising a standard included in said mower and being uprightly fixedly disposed, threaded means interconnected between said mower and said standard for upright adjustment of the latter between selected fixed positions, a rotatable member rotatably mounted on said standard, an offset member attached to said rotatable member and constituting a cam with the eccentricity extending in the upright plane for upright displacement of said offset member upon rotation of said rotatable member, indexing means operatively interconnected between said mower and said rotatable member for rotating the latter and locking with said mower in a selected indexed position, said ground-engaging roller being mounted on said offset member for upright adjustable movement in response to rotation of said member.

3. A cutting adjustment for a lawn mower of the type including a cutting reel and a bed knife and a rotatably mounted ground-engaging roller, comprising a frame included in said mower, a standard adjustably mounted on said mower for adjustable movement thereon in an upright plane to selectable fixed positions and having a circular socket in the lower end thereof, a circular member rotatably mounted in said socket, a shaft attached to said circular member and extending across said mower and being connected to said circular member for rotation with said circular member and being offset from the axis of said circular member and constituting a cam with the eccentricity extending transverse to the axis of said socket for offset movement with respect to said axis upon rotation of said circular member, indexing means attached to said shaft for rotating the latter along with said circular member, means releasably interconnected between said indexing means and said mower for releasably securing said indexing means in a selected position, and said ground-engaging roller being rotatably mounted on said shaft for adjustable upright displacement in response to rotation of said shaft.

4. A cutting adjustment for a lawn mower of the type including a frame and a cutting reel and a bed knife and a rotatably mounted ground-engaging roller, comprising a frame included in said mower, a standard adjustably fixedly mounted on said mower for selective positioning fixedly thereon in an upright plane and having a circular socket in the lower end thereof, a circular member rotatably mounted in said socket, a shaft attached to said circular member and extending across said mower and being connected to said circular member for rotation with said circular member and being axially offset with respect to the axis of said circular member and constituting a cam with the eccentricity extending transverse to the axis of said socket for offset movement with respect to said axis upon rotation of said circular member, a rack on said frame, a lever attached to said shaft for rotating the latter along with said circular member and with said lever including a portion extending transverse to said axis and being slidably engaged with said rack along the line between said rack and said shaft and being fixed transverse to said line, and said ground-engaging roller being rotatably mounted on said shaft for adjustable upright displacement in response to rotation of said shaft.

5. A cutting adjustment for a lawn mower of the type including a cutting reel and a bed knife and a rotatably mounted ground-engaging roller, comprising a standard included in said mower and being uprightly disposed, threaded means interconnected between said mower and said standard for upright adjustment of the latter to selected fixed positions, a rotatable member rotatably mounted on said standard relative to the fixed position of the latter, an offset member attached to said rotatable member and constituting a cam with the eccentricity extending in the upright plane with respect to the axis of said rotatable member for upright displacement upon rotation of said rotatable member, indexing means interconnected between said mower and said rotatable member for rotating the latter, the connection between said indexing means and said mower being a movable interconnection in the direction necessary to respond to the movement of said threaded means and being fixed in a selected position transverse to said direction, said ground-engaging roller being mounted on said offset member for upright adjustable movement in response to rotation of said member.

References Cited in the file of this patent
UNITED STATES PATENTS

| | | |
|---|---|---|
| 2,660,018 | Clemson | Nov. 24, 1953 |
| 2,667,026 | Ingram | Jan. 26, 1954 |
| 2,705,861 | Mott | Apr. 12, 1955 |